United States Patent [19]
Ho et al.

[11] Patent Number: 5,745,276
[45] Date of Patent: Apr. 28, 1998

[54] UNIVERSAL OPTICAL SIGNAL RECEIVER

[75] Inventors: Ching Ho; Yue-Syan Jou, both of San Jose; Chun-Meng Su, Moraga; Peter Wang, Sunnyvale; Yong Cheng Tu, Santa Clara, all of Calif.

[73] Assignee: Qualop Systems Corporation, Sunnyvale, Calif.

[21] Appl. No.: 430,893

[22] Filed: Apr. 27, 1995

[51] Int. Cl.$^6$ ................................................ H04B 10/06
[52] U.S. Cl. ........................ 359/189; 359/194; 250/214 A
[58] Field of Search .................................. 359/189, 194, 359/161; 250/214 A; 330/59, 308

[56] References Cited

U.S. PATENT DOCUMENTS

| | | | |
|---|---|---|---|
| 4,998,012 | 3/1991 | Kruse | 250/214 A |
| 5,347,389 | 9/1994 | Skrobko | 359/189 |
| 5,477,370 | 12/1995 | Little et al. | 359/189 |

*Primary Examiner*—Kinfe-Michael Negash
*Attorney, Agent, or Firm*—Robert P. Sabath

[57] ABSTRACT

An optical receiver communication system converts optical signals modulated by analog or digital waveforms to RF signals. The optical receiver contains an automatic level control circuit to adjust the electronic gain of the system accordingly across a broad bandwidth spectrum. Two impedance matching circuit are designed using broad band matching technique to expand the bandwidth for increasing the maximum receivable frequency to 1 GHz. A RLC impedance matching circuit forms a resonant combination to maintain ±1 dB fluctuation between the low-and high-frequency limits of the bandwidth, and a 75 Ω impedance matching circuit creates a 180° phase shift between the outgoing and the incoming signal for low return loss.

19 Claims, 11 Drawing Sheets

5,745,276

1

UNIVERSAL OPTICAL SIGNAL RECEIVER

FIELD OF INVENTION

The present invention relates generally to optical fiber communication systems and more particularly to optical receivers for converting an optical signal to an analog or digital radio frequency (RF) signal.

DESCRIPTION OF BACKGROUND ART

In today's ever-increasing traffic on the information superhighway, fiber optic communication systems provide an important medium for local and long distance data transmission. Information is carried on optical cables at frequencies within a broad bandwidth spectrum. As more information is dumped onto the coaxial or optical cables, the signal capacity within the broad bandwidth spectrum is crowded with information, leading to associated traffic congestion.

Typical fiber optic communication systems include a transmitter, a receiver, and fiber optic cables. The transmitter generates a modulated light signal from an RF signal which transmits to its intended receiver through the fiber optic cables. The receiver converts the light signals back to the original RF signals.

Conventional optical receivers contain impedance matching circuits which match the impedance in a narrow frequency range available for cable television (CATV) channels in the frequency range from 50 MHz to 550 MHz. These optical receiver systems restrict the information transfer rate in the lower spectrum frequency range. In addition, such receivers are limited in input power range and are susceptible to instability of output RF signal. On the receiver output, surge protectors and bias tees implemented with the combination of parasitic capacitance and inductance, are commonly provided. The combination of these two components yield poor return loss performance.

Hence, there is a need to provide an optical receiver with broader bandwidth spectrum to facilitate handling of greater amounts of information.

SUMMARY OF THE INVENTION

The invention disclosed includes an optical receiver system that converts an analog or digital optical signal to an RF electrical signal. The optical receiver system contains impedance matching circuits and an automatic level control (ALC) circuit. The impedance matching circuit expand the frequency spectrum and to increase the transmission rate of the optical signals to about 1 GHz. ALC broadens input dynamic range and improves stability of output RF signals.

The two impedance matching circuits match the frequency of the electrical signal to achieve desirable flatness and maximum return loss. One of the impedance matching circuits is coupled to the output side of the optical receiver and includes a specified length of 75 Ω transmission line to maximize return loss. The second impedance matching circuit is implemented in resistor-inductor-capacitor (RLC) configuration and is placed inside the optical receiver to form a resonant circuit that achieves low flatness parameters.

In addition, an automatic level control circuit (ALC) employs a feedback loop to adjust the gain of the electronic signal as it propagates through the receiver system. Monitoring of the signal gain by the ALC circuit maintains the stability of the RF signal at the receiver output.

Further, the optical receiver of the present invention facilitates information transfer on two popular forms of fiber communication networks, namely on the local and long distance transmission networks. Multiple optical receivers can be concatenated, if needed, to receive the optical signals on long distance networks (also known as wavelength 1550 nm systems). For the local information transfers (known as wavelength 1310 nm systems), one optical receiver is sufficient to relay the optical signal from the source to the destination.

DETAIL DESCRIPTION OF THE PREFERRED EMBODIMENT

Figure 1:
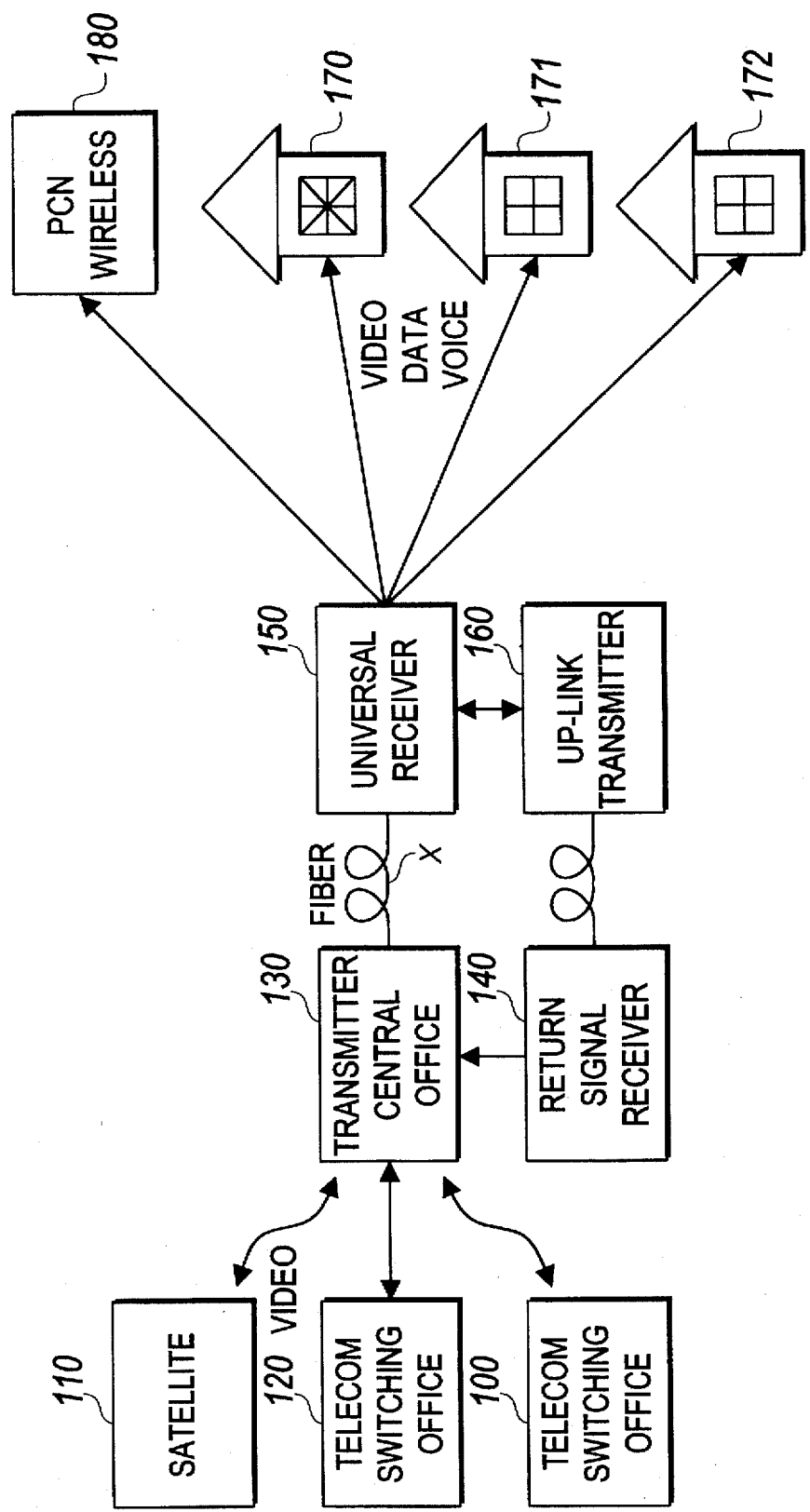
FIG. 1 shows a general block diagram of a fiber optic communication system of the present invention.

Referring now to FIG. 1, there is shown a pictorial representation of a fiber optic communication system for transmitting and receiving various types of signals, including video, voice, and data signals. A transmitter central office 130 collects electrical signals from several sources, such as a satellite 110, a telcom switching office 120, and a microwave link 100, and transmits optical signals via fiber cables X to an optical receiver 150. The optical receiver 150 converts the received optical signal to an electrical signal to be distributed to selected destinations, such as government agencies, offices, or homes. In addition, the optical receiver 150 contains an up-link transmitter (return path) 160 to send a signal from the destination back to the transmitter central office 130 through return signal receiver 140, which enables interactive communication between the transmitter central office 130 and various destinations, such as a Personal Communication Network (PCN) 180 and homes 170, 171, and 172.

Figure 2:
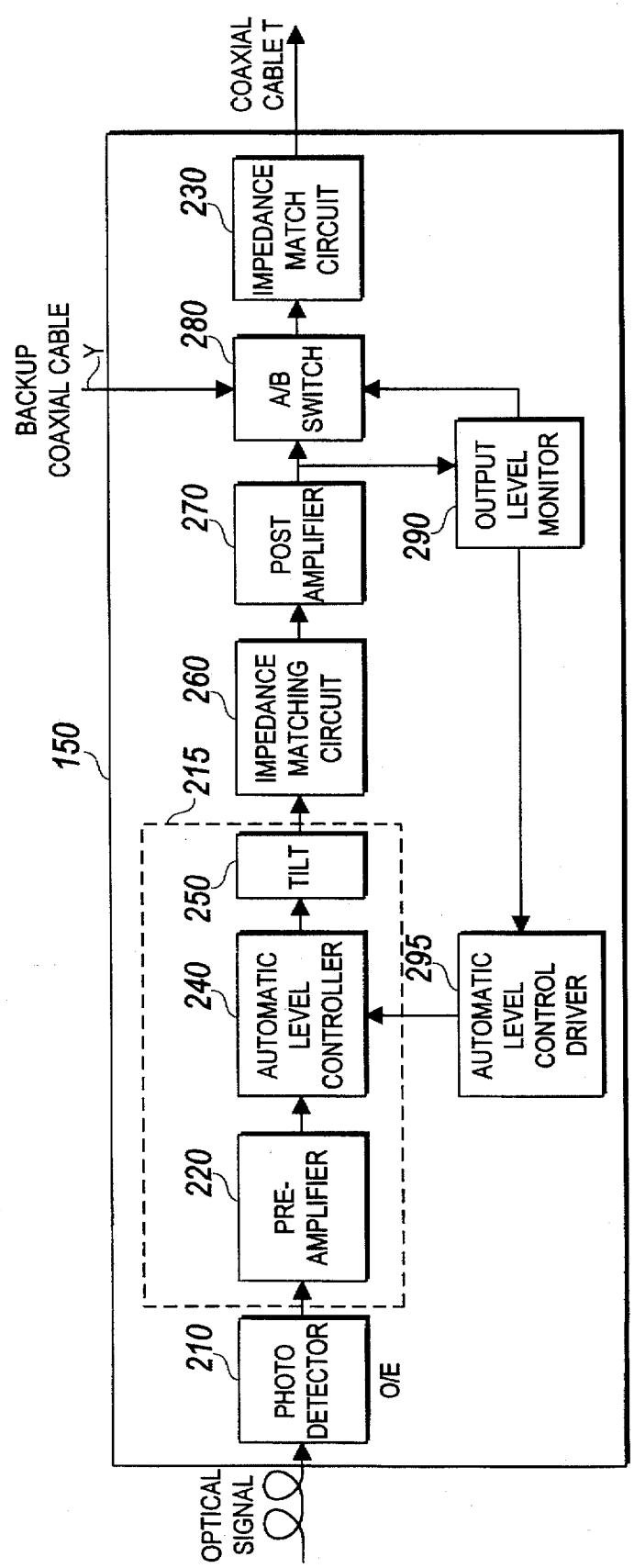
FIG. 2 illustrates a block diagram of an optical receiver of the present invention.

Referring now to FIG. 2, there is shown a block diagram of the optical receiver 150 of the present invention. A photo detector 210 receives the optical signal and converts the light signal to an electrical signal in conventional manner. A signal processing circuit 215 contains a pre-amplifier 220, an automatic level controller (ALC) 240, and a tilt circuit 250, for receiving the electrical signal from the photo detector 210 and transmitting the corresponding electrical signal to an impedance matching circuit 260. The pre-amplifier 220 increases the gain of the electrical signal, which is generally too weak in amplitude to deliver a signal sufficiently strong for use in an optical system without amplification. In order to reduce the effect of temperature fluctuations and environmental changes, an ALC 240 circuit coupled to the output of the pre-amplifier 220 functions as a tunable attenuator to maintain the stability of the output signal in conventional manner in which the output signal is fed back within the ALC 240 to adjust the amplitude of the signal accordingly. A tilt circuit 250 adjusts the slope or gain (amplitude vs. frequency) of the signal received from the output of the ALC 240 to compensate for signal losses at high frequencies on the coaxial cable due to the signal decay along the length of the coaxial cable.

Two impedance matching circuits 230 and 260 are implemented in the optical receiver 150 to increase the broad band frequency to 1 GHz. The impedance matching circuit 260 matches the frequency of the electrical signal by using a resistor-inductor-capacitor (RLC) combination to form a resonance to adjust the amplitude of the low frequency spectrum, achieving a flatness parameter of ±1 dB. The impedance matching circuit 230 contains a selected length of 75 Ω transmission line to absorb the reflected signal from propagating back into the output of the optical receiver 150, thereby minimizing injected noise distortion from coaxial cable T. FIG. 5B further illustrates the operations of the impedance matching circuit 260 while FIG. 5B details the effect of 75 Ω transmission line. A post-amplifier 270, similar to pre-amplifier 220, is connected after impedance matching circuit 260 to boost the amplitude of the electrical signal. An A/B switch 280 is an optional multiplexer for selecting between receiving the electrical signal propagated through optical receiver 150 or bypassing optical receiver 150 with a direct connection to the A/B switch from a coaxial cable input Y.

The electrical signal at the output of the optical receiver 150 is supplied to the impedance matching circuit 230 which matches the received electrical signal to achieve maximum return loss performance by absorbing the reflected signal from distorting noise into optical receiver 150. An optical return loss is defined as 10 log (Pi/Pr), where Pr is the reflected optical power from the receiver, and Pi is the incident optical power to the receiver. In other words, return loss is a measure of the incident optical power to the receiver as compared to the reflected optical power from the receiver. An output level monitor 290 is coupled between the output of a post-amplifier 270 and the input of an ALC driver 295 to increase or to decrease the amplitude of the electrical signal depending on whether the output signal level is below or above a pre-determined preferred signal level. If the output signal is above the pre-determined signal level, then the output signal is received from the post amplifier 270. However, if the output signal falls below a pre-determined signal level, which indicates the optical receiver 150 is not operable, then the optional A/B switch 280 connects with backup coaxial cable Y to receive alternative signal inputs and thus bypasses the optical input of the optical receiver 150. An ALC driver 295 asserts the signal strength to the ALC circuit in accordance to the determination by the output level monitor 290.

The overall performance of the optical receiver 150 is dictated primarily by three parameters, namely, flatness, output return loss, and optical dynamic range. The frequency response flatness and stability are determined by the resistor 530 and the capacitor 520 and the inductor 510 in the impedance matching circuit 260. The numerical values of the flatness and return loss parameters depend largely on the maximum frequency response allowed by impedance matching circuits 230 and 260. The third parameter, optical dynamic range, is defined as a range of desirable input power level to the optical receiver. On the one end, high input optical power can overload the circuitry, resulting in large distortions of the resultant output RF signal. On the other end, low optical input power generally includes large amounts of noise that reduces the signal to noise ratio.

Figure 3:
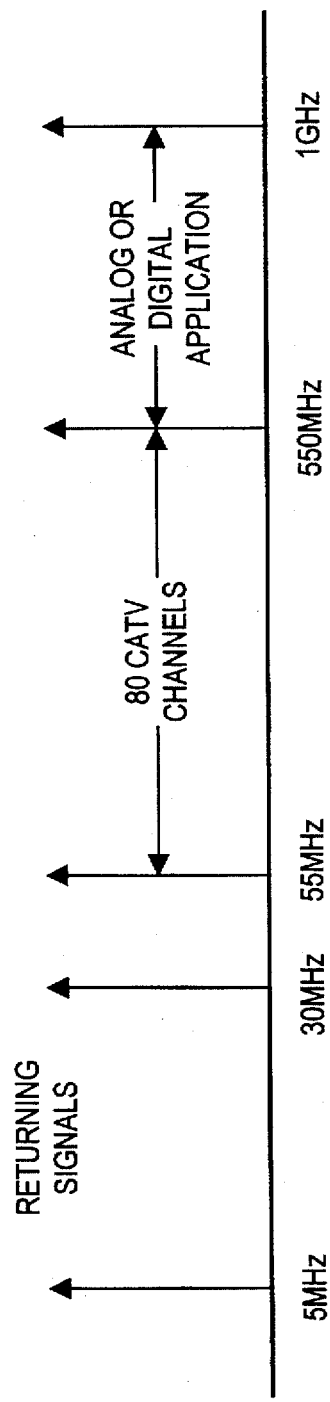
FIG. 3 shows the bandwidth spectrum for various optical fiber applications.

Referring now to FIG. 3, there are shown the bandwidths for various signal communication applications over a portion of the frequency spectrum. The cable television channels occupy the bandwidth between 55 MHz and 550 MHz. The optical receiver 150 operates in the upper end of the frequency range from about 550 MHz to 1 GHz to allow receiving of optical data in both analog or digital format. The bandwidth of 5 MHz to 30 MHz is reserved for returning signal path.

Figure 4A:
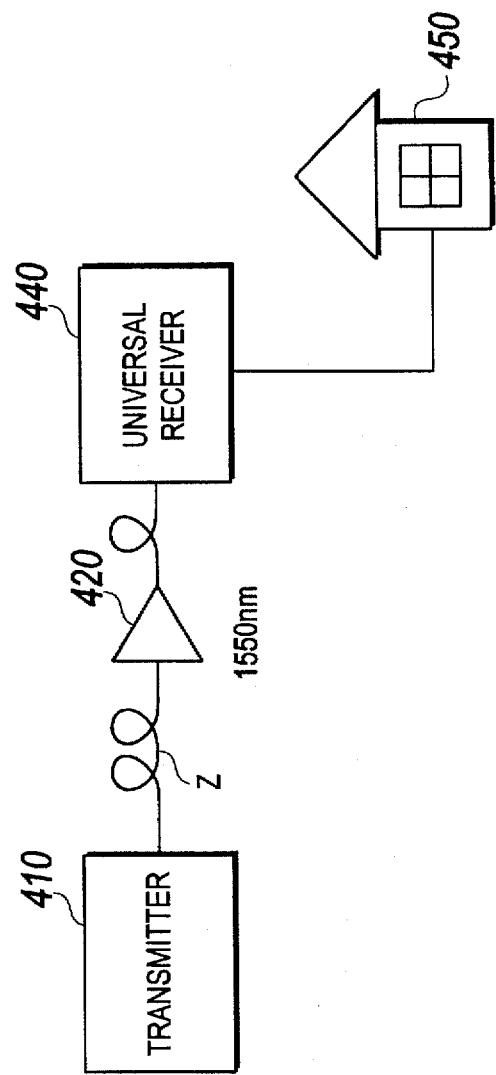
FIG. 4A is a block diagram of the optical receiver in a 1550 nm system.
Figure 4B:
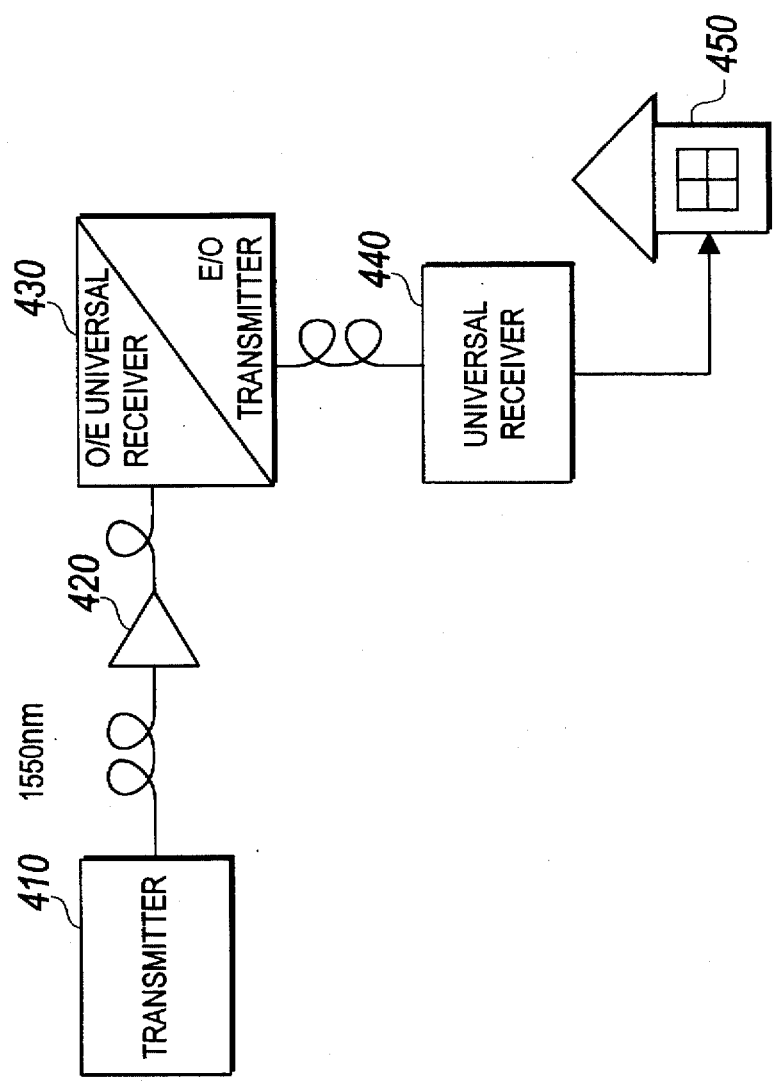
FIG. 4B is a block diagram of the optical receiver in a combination of 1550 nm and 1310 nm system.

Referring now to FIG. 4A and 4B, there are shown alternative embodiments of the optical receiver 150 designed to receive light signals in communication systems operating at wavelengths of 1310 nm and 1550 nm. In optical fiber communication systems, voice and video signals may be carried as light signals with different transmission rates based upon the light wavelengths of 1310 nm or 1550 nm. Typically, the 1310 nm light signals are selected for local distribution as shown in 435 and the 1550 nm light signals are chosen for long distance communication as illustrated in 425.

Initially, a transmitter 410 sends optical signals onto the fiber cables Z where an optical amplifier 420 controls the gain of the signal to the optical receiver system. For local distribution system, as shown in FIG. 4B, the preferred embodiment for light signals of 1310 nm wavelength includes single optical signal receiver 430. However, for long distance distribution system, another universal receiver, such as an optical receiver 440, is connected to the optical receiver 430 to increase the amplitude of the optical signal so that the subsequent universal receiver 440 functions as a repeater to amplify electrical signals to destination 450 as illustrated in FIG. 4B. Optical receiver 440 may be operable on dual wavelengths of 1310 nm and 1550 nm light signals such that optical receiver 430 sends fiber optical signals on 1550 nm wavelength to optical receiver 440 in 1310 nm wavelength.

Figure 5A:
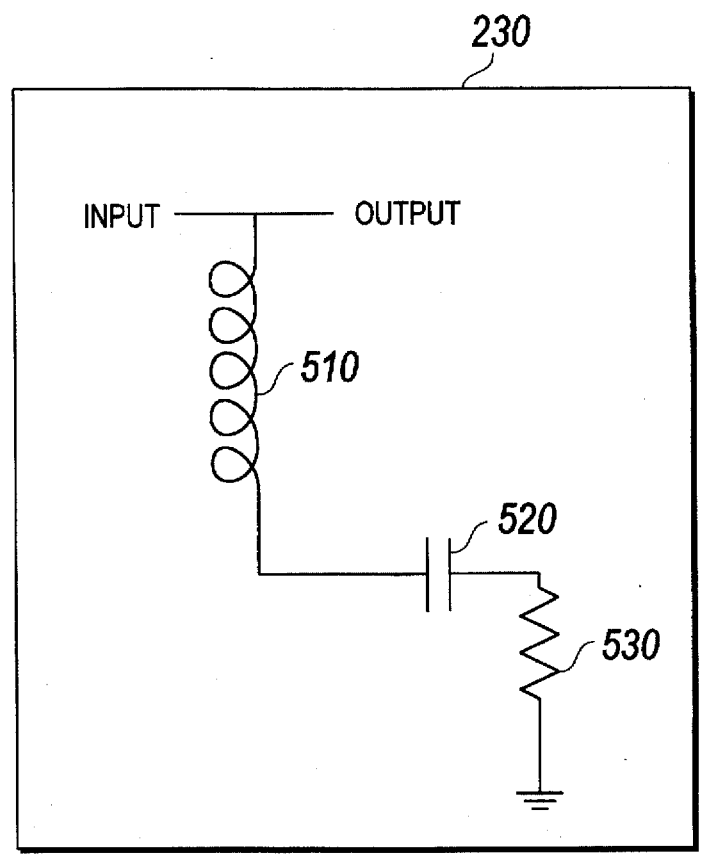
FIG. 5A shows a schematic circuit of an impedance matching circuit in RLC configuration of the present invention.
Figure 5B:
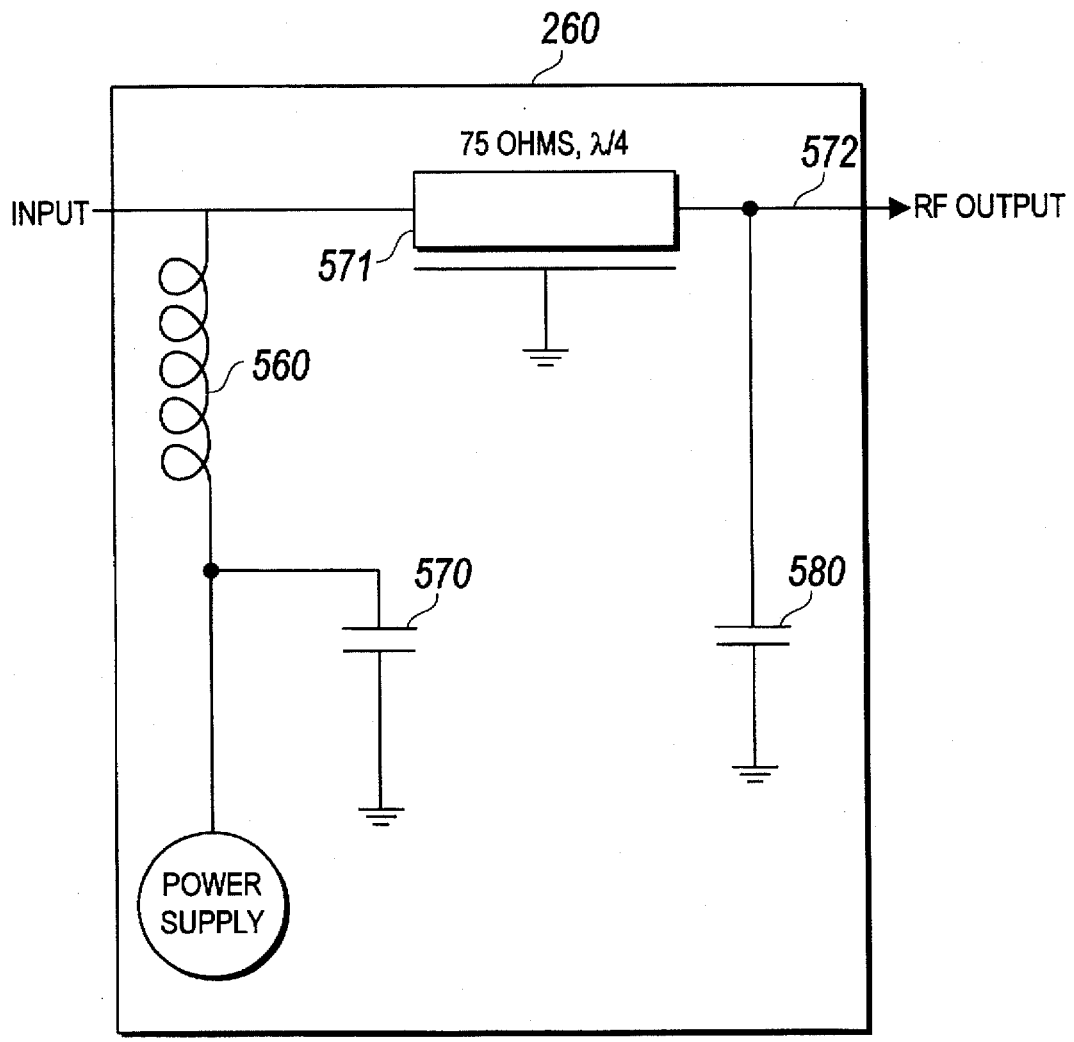
FIG. 5B shows a schematic circuit of an impedance matching circuit in 75 Ω transmission line of the present invention.

Referring now to FIG. 5A, there is shown an embodiment of impedance matching circuit 230. Impedance matching circuit 230 is a series RLC combination circuit which is selected to resonate at about 300 MHz. This produces about 2 dB loss, or ±1 dB deviation in the flatness of frequency response across the entire frequency band. The resulting signal deviation of 2 dB between the low frequency and the high frequency maintains the clarity of all channels in the frequency spectrum without injecting noise distortion across the bandwidth when the signal amplitude exceeds 2 dB. The combination of RLC with a resistor connected to the ground improves the signal amplitude deviation in the low frequency and keeps the deviation within an acceptable fluctuation of 2 dB. Otherwise, if the signal amplitude deviation exceeds the 2 dB variation, then the signal channels as referred to in FIG. 3 in the high frequency would interfere with the channels in the low frequency, thereby distorting the signals and creating for example, snowy lines on a display screen.

Referring now to FIG. 5B, there is shown an embodiment of the impedance matching circuit 230. The impedance matching circuit 230 adjusts the tuning of the impedance to achieve maximized return loss (−16 dB) with a high return loss numerical value to minimize injecting noise distortion at the output side of the optical receiver 150. The impedance matching circuit 260 includes a 75 Ω transmission line 571 with a parasitic inductor 560 and capacitors 570 and 580, which combine to match the system impedance to 75 Ω and achieve maximum return loss. A length of transmission line 571 is cut with precision to λ/4 characteristics at 750 MHz. The signal at the output 571 propagates onto coaxial cable T with noise signals reflected back to the optical receiver 150. The 75 Ω transmission line 571 provides a 90° phase shift between outgoing and reflected back signals. In one embodiment, 90° phase shift is added to the outgoing signal and a 90° phase shift is subtracted from the reflected back signal. The net effect is a 180° phase shift between the signals, thus canceling the two signals in achieving maximum return loss.

Figure 6:
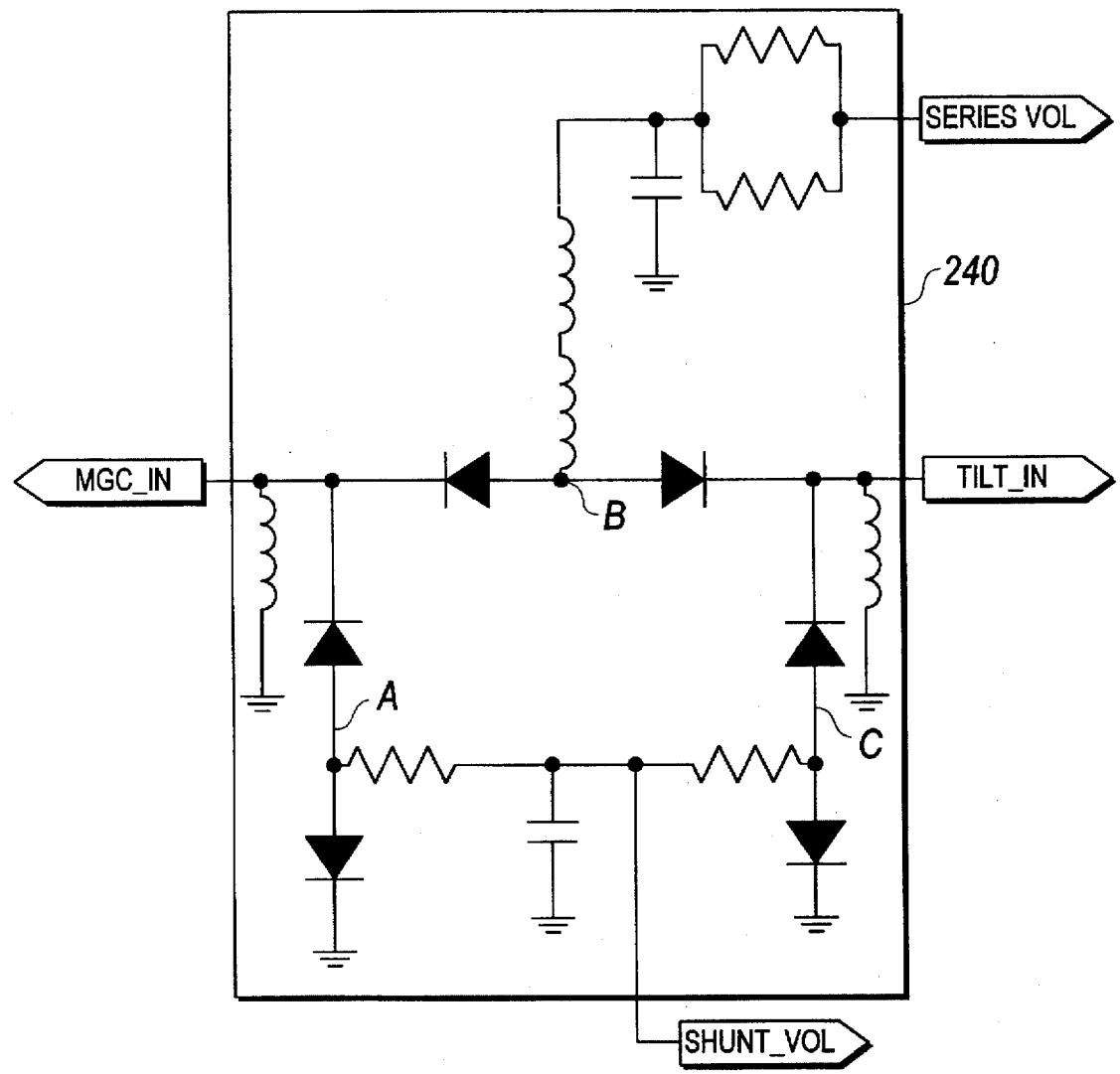
FIG. 6 is a schematic circuit of an automatic level control circuit of the present invention.

Referring now to FIG. 6, there is shown a schematic of ALC 240 circuit of the present invention. Three back-to-back diode pairs A, B, and C are configured to form a π pad. As electrical currents through the diodes fluctuate, the impedance of each diode pair adjusts to maintain the value close to 75 Ω. The three pairs of diodes A, B, and C provide about 20 dB tuning range and at the same time provide a desirable impedance match with the optical receiver 150. The gain of impedance matching circuit 230 can be adjusted automatically to maintain the RF output at a stable level notwithstanding the fluctuation of the input optical power and changes in the operating temperature. In addition, ALC circuit 240 provides a broader RF power level at the input stage (0 to ≅−5 dBm) and constant output RF level at the selected value in the range of 25–35 dBmV at the output stage.

Figure 7A:
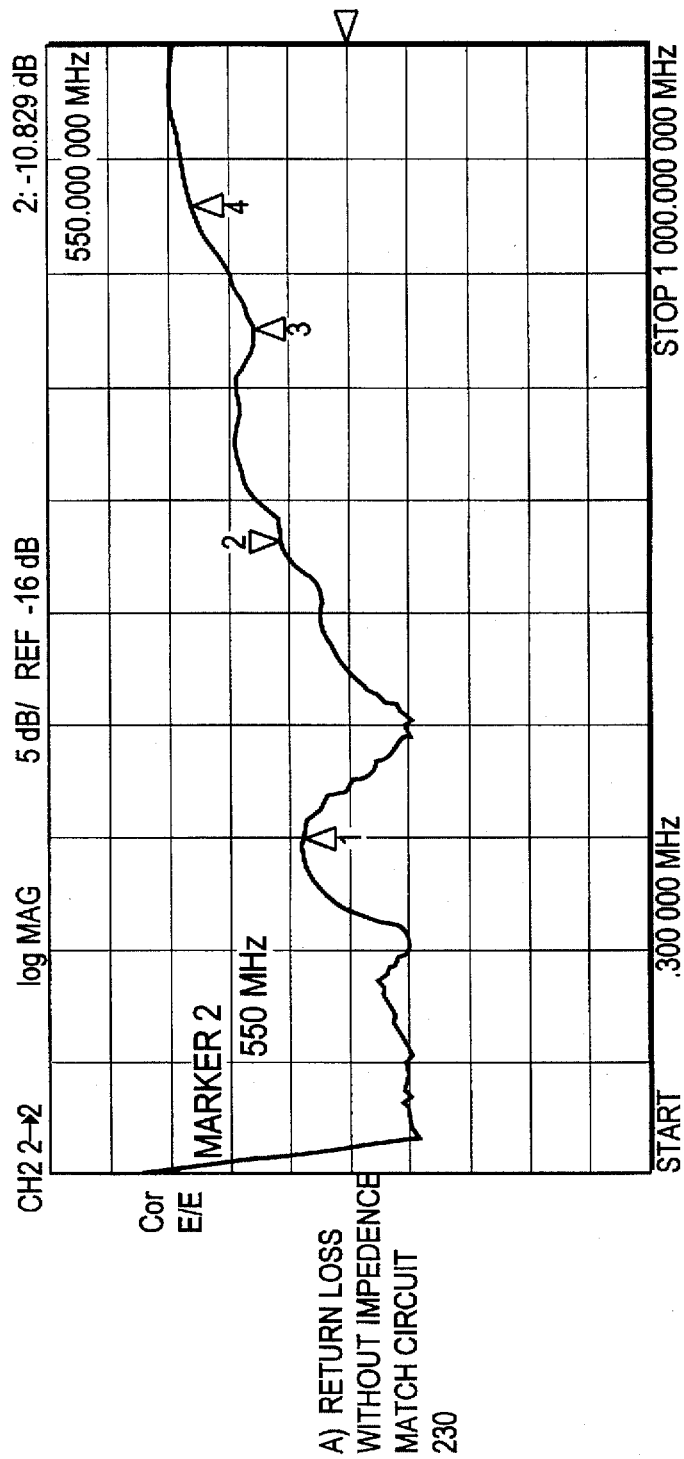
FIG. 7A shows a graphical representation of return loss characteristics without the 75 ohm transmission line impedance matching circuit of the present invention.
Figure 7B:
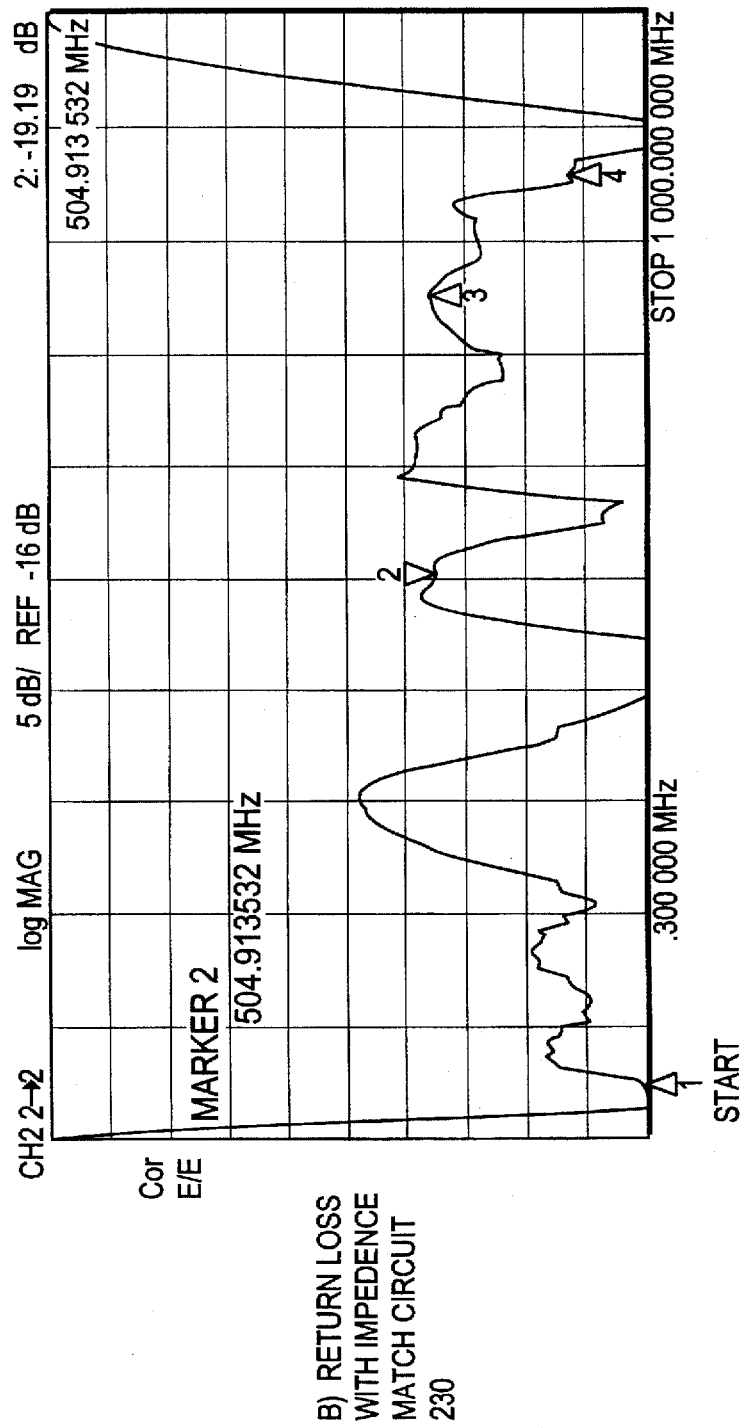
FIG. 7B shows a graphical representation of return loss characteristics with the 75 ohm transmission line impedance matching circuit of the present invention.
Figure 7C:
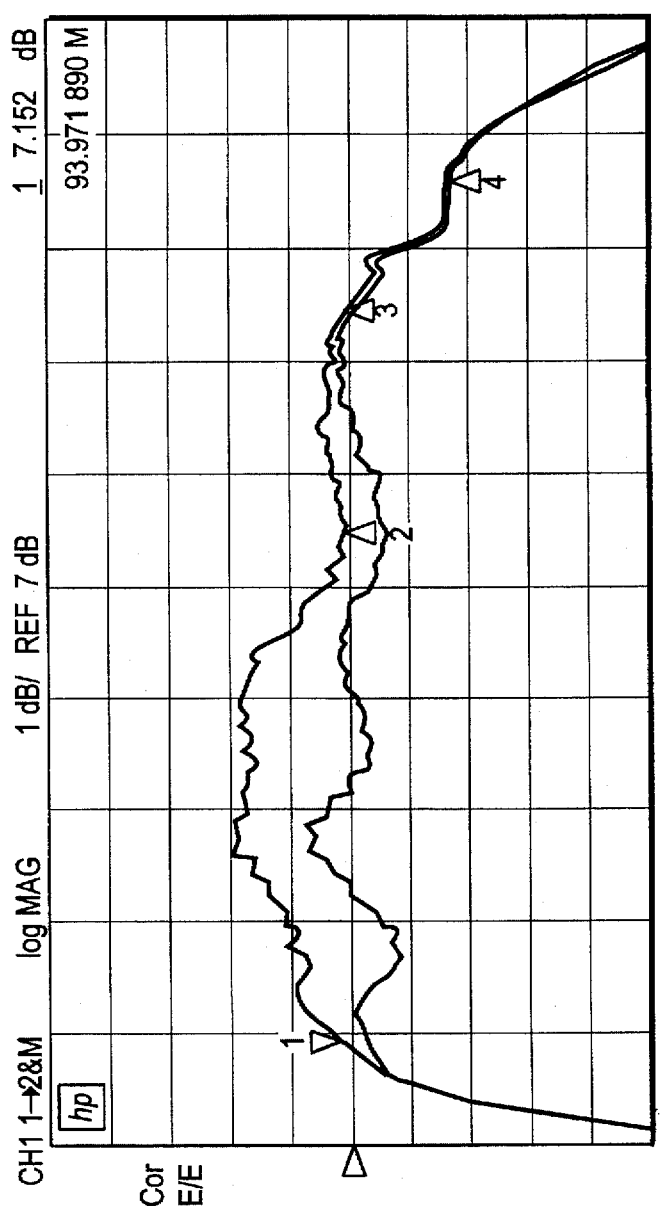
FIG. 7C shows a graphical representation of flatness characteristics with and without the RLC impedance matching circuit of the present invention.

Referring now to FIG. 7A and 7B, and 7C there are shown graphs illustrating the characteristics of flatness and return loss with and without the inclusion of the impedance matching circuit 260 and the impedance matching circuit 230. In FIG. 7C, the graph illustrates the characteristics of flatness waveforms of RF signals with and without the compensation of the RLC impedance matching circuit 260. The x-axis represents the frequency spectrum from 0 to 1 GHz, and the y-axis represents the amplitude deviations in 1 dB increments. The waveform 710 illustrates the flatness characteristics of an optical receiver without the impedance matching circuit 260 in which the graph between low and high frequencies contains amplitude deviations of greater than 2 dB. The waveform 720 of FIG. 7C shows the transmission characteristics with the impedance matching circuit 260 included. The effect of the impedance matching circuit 260 pulls the amplitude of the lower frequency signal lower for more consistent performance with less signal deviations (i.e., within ±1 dB) between the low and high frequencies. Similarly, in FIG. 7A and 7B, the graph shows the return loss characteristics, illustrating the signal with and without the compensation of the 75 Ω transmission line in the impedance matching circuit 230 placed on the output side of the receiver.

What is claimed is:

1. An optical receiver comprising:
  a photo detector disposed to receive an input optical signal having a plurality of channels at selected wave bands for converting said input optical signal to a corresponding electrical signal;
  a first impedance matching circuit coupled to said photo detector for maintaining a substantially consistent power level across said plurality of channels; and
  a second impedance matching circuit coupled to said first impedance matching circuit for transmitting said electrical signal onto a coaxial cable, said second impedance matching circuit being effective for reducing return loss in electric signals transmitted from said second impedance matching circuit to a coaxial cable.

2. The optical receiver according to claim 1 including a signal processing circuit coupled between said photo detector and said first impedance matching circuit, said signal processing comprising a pre-amplifier circuit having an input coupled to an output of said photo detector, said preamplifier circuit being effective for increasing the amplitude of said electrical signal.

3. An optical receiver comprising:
  a photo detector disposed to receive an input optical signal having a plurality of channels at selected wave bands for converting said input optical signal to a corresponding electrical signal:
  a first impedance matching circuit coupled to said photo detector for compensating the signal flatness to maintain consistent power level across said plurality of channels:
  a second impedance matching circuit coupled to said first impedance matching circuit for transmitting said electrical signal onto a coaxial cable for reducing the return loss: and
  a signal processing circuit coupled between said photo detector and said first impedance matching circuit, the signal processing circuit comprising a pre-amplifier circuit having an input coupled to an output of said photo detector for increasing the amplitude of said electrical signal, and comprising an automatic level control circuit having an input coupled to an output of said pre-amplifier for maintaining the stability of said electrical signal by adjusting the amplitude of said electrical signal in a broad dynamic range transparent to 1310 nm and 1550 nm optical wavelengths.

4. The optical receiver according to claim 3 wherein said signal processing circuit further comprises a tilt circuit having an input coupled to an output of said automatic level control circuit for adjusting amplitude change with frequency of said electrical signal.

5. The optical receiver according to claim 4 further comprises a post amplifier having an input coupled to said first impedance matching circuit for amplifying the gain of said electrical signal.

6. The optical receiver according to claim 5 further comprises a switch having a first input port coupled to an output of said post amplifier and a second input port coupled to a coaxial cable and an output port coupled to an input of said second impedance matching circuit for selectively receiving signal from said first input port or said second input port.

7. The optical receiver according to claim 6 further comprises an output level monitor circuit having an input port coupled to said output port of said post amplifier for receiving said electrical signal from said output port of said post amplifier, having a first output port coupled to said switch for informing said switch whether said optical receiver is functioning properly and having a second output port coupled to an automatic level control driver for controlling the amplitude of said electrical signal.

8. The optical receiver according to claim 7 further comprises an automatic level control driver circuit having an input coupled to said output level monitor circuit and having an output coupled to said automatic level control circuit for supplying said electrical signal to said automatic level control circuit.

9. An optical receiver system comprising:
   a photo detector disposed to receive an input optical signal having a plurality of channels at selected wave bands, said photo detector being effective for converting said input optical signal into a corresponding electrical signal;
   a first impedance matching circuit coupled to said photo detector for maintaining a consistent power level across said plurality of channels; and
   a second impedance matching circuit coupled to said first impedance matching circuit for transmitting said electrical signal onto a coaxial cable with reduced return loss.

10. The optical receiver system according to claim 9 wherein said second impedance matching circuit comprises a 75 Ω transmission line for preventing a reflected return signal from injecting noise distortion to said output of said second impedance matching circuit.

11. The optical receiver system according to claim 10 wherein said first impedance matching circuit comprises in series a register, an inductor and a capacitor for resonating said electrical signal.

12. The optical receiver system according to claim 11 wherein a signal processing circuit is coupled between said photo detector and said first impedance matching circuit and comprises a pre-amplifier circuit having an input coupled to an output of said photo detector for increasing the amplitude of said electrical signal.

13. An optical receiver system comprising:
   a photo detector disposed to receive an input optical signal having a plurality of channels at selected wave bands for converting said input optical signal to corresponding electrical signal:
   a first impedance matching circuit coupled to said photo detector for compensating the signal flatness to maintain consistent power level across said plurality of channels, said first impedance circuit comprises a series resistor-inductor-capacitor for resonating said electrical signal,
   a second impedance matching circuit coupled to said first impedance matching circuit for transmitting said electrical signal onto a coaxial cable for reducing the return loss, wherein said second impedance matching circuit comprises a 75 Ω transmission line for absorbing a reflected return signal from injecting noise distortion to said output of said second impedance matching circuit; and
   a signal processing circuit coupled between said photo detector and said first impedance matching circuit, the signal processing circuit comprising a pre-amplifier circuit having an input coupled to an output of said photo detector for increasing the amplitude of said electrical signal, and comprising an automatic level control circuit having an input coupled to an output of said pre-amplifier for maintaining the stability of said electrical signal by adjusting the amplitude of said electrical signal in a broad dynamic range transparent to 1310 nm and 1550 nm optical wavelengths.

14. The optical receiver system according to claim 13 wherein said signal processing circuit comprises a tilt circuit having an input coupled to an output of said automatic level control circuit for adjusting amplitude change with frequency of said electrical signal.

15. The optical receiver system according to claim 14 further comprises a post amplifier having an input coupled to said first impedance matching circuit for amplifying the gain of said electrical signal.

16. The optical receiver system according to claim 15 further comprises a switch having a first input port coupled to an output of post amplifier, having a second input port coupled to an input from a coaxial cable and having an output port coupled to an input of said second impedance matching circuit for selecting to receive from said first input port or said second input port.

17. The optical receiver system according to claim 16 further comprises an output level monitor circuit having an input port coupled to said output port of said post amplifier for receiving said electrical signal from said output port of said post amplifier, and a first output port coupled to said switch for informing to said switch whether said optical receiver is functioning properly and a second output port coupled to an automatic level control driver for controlling the amplitude of said electrical signal.

18. The optical receiver system according to claim 17 further comprises an automatic level control driver circuit having an input coupled to said output level monitor circuit and having an output coupled to said automatic level control circuit for supplying said electrical signal to said automatic level control circuit.

19. A method for converting an optical signal to an RF signal with a first impedance matching circuit and a second impedance matching circuit, the method comprising:
   receiving said optical signal and converting it to an RF signal;
   maintaining frequency deviations of said RF signal within ±1 dB across a selected broad bandwidth spectrum with said first impedance matching circuit;
   absorbing a reflected return signal to prevent injection of noise distortions to said RF signal with said second impedance matching circuit.

* * * * *